United States Patent [19]

Ohgake et al.

[11] Patent Number: 5,171,596
[45] Date of Patent: Dec. 15, 1992

[54] METHOD FOR FRESH PRESERVATION OF FOODSTUFFS

[75] Inventors: Ryoji Ohgake, Chiba; Mitsuo Okada; Hiroyuki Takashima, both of Yokohama, all of Japan

[73] Assignee: Nippon Oil Co., Ltd., Japan

[21] Appl. No.: 607,880

[22] Filed: Nov. 1, 1990

[30] Foreign Application Priority Data

Jul. 2, 1990 [JP] Japan .................................. 2-174992

[51] Int. Cl.$^5$ .............................................. A23D 9/06
[52] U.S. Cl. .................................. 426/330.6; 426/302; 426/608
[58] Field of Search ...................... 426/330.6, 541, 607, 426/608, 530, 102, 333, 308, 302

[56] References Cited

U.S. PATENT DOCUMENTS 2,768,084 10/1956 Griffith .............................. 426/541
4,968,518 11/1990 Lopez .............................. 426/330.6
4,997,666 3/1991 Albeck .............................. 426/330.6

FOREIGN PATENT DOCUMENTS 0155205 12/1979 Japan .................................. 426/541

OTHER PUBLICATIONS

Lee, Frank 1975 Basic Food Chemistry AVI Publishing Co. Inc. Westport Conn. p. 374.
National Academy of Sciences 1965 Chemicals used in Food Processing p. 10.
Food Technology 1957 vol. 11, No. 5, pp. 260–261.

*Primary Examiner*—Carolyn Paden
*Attorney, Agent, or Firm*—Ostrolenk, Faber, Gerb & Soffen

[57] ABSTRACT

A composition for the freshness-preservation of foodstuffs is disclosed which comprises, as an active base a triglyceride of saturated fatty acids (I) corresponding to the following general formula:

$$\begin{array}{l} CH_2-OCOR^1 \\ | \\ CH-OCOR^2 \\ | \\ CH_2-OCOR^3 \end{array} \quad (I)$$

wherein: $R^1$, $R^2$ and $R^3$ are the same or different, linear aliphatic hydrocarbon groups containing from 5 to 21 carbon atoms.

5 Claims, No Drawings

METHOD FOR FRESH PRESERVATION OF FOODSTUFFS

BACKGROUND OF THE INVENTION (1) Field of the Invention

This invention relates to a composition for the freshness-preservation of foodstuffs. More particularly, this invention relates to an antibacterial composition for the freshness-preservation of foodstuffs comprising a triglyceride of saturated fatty acids as an active base.

(2) Description of the Prior Art

A wide variety of food preservatives have been used in the storage of farm products, livestock products, seafood, and the like to effect preservation, the water retainment, and storage. Such preservatives include, for example, paraffin wax used for apple and mandarin orange, antioxidant used for seafood, and white oil for livestock products.

Storage at a low temperature has been a usual practice to preserve the freshness and to retain water of vegetables such as radish, carrot, cucumber, eggplant, and green pepper. A low viscosity paraffinic oil as preservative has been used in the storage of livestock products such as pork and beef. Further, the so-called preservatives have been used as food additives in the storage of seafood such as roes of salmon and herring, as well as dried fish.

Although these additives have been approved for use as food preservatives in the storage of fresh foodstuffs for the purpose of freshness-preservation, water-retainment, and storage, the search for new, safe and effective food preservatives has intensified recently because of increased concern about the overall safety of some of the known additives, white oil in particular, which are derived from mineral oil or are synthetic materials.

Under present circumstances, there is a strong indication in Europe and the United States that mineral oil including white oil may be limited or prohibited by law from use as a food preservative.

It has now been found that specific triglyceride of saturated fatty acids exhibit an excellent food-preservative effect for use in the storage of fresh foodstuffs.

OBJECT OF THE INVENTION

It is the object of this invention to provide new, safe and effective food-preservative compositions in which said compositions exhibit excellent freshness-preserving power, storagability, water-retaining effect, and antibacterial activity when used in the storage of fresh foodstuffs.

SUMMARY OF THE INVENTION

The benefits and advantages of the present invention are achieved in accordance with the composition aspects thereof by providing a composition for the freshness-preservation of foodstuffs comprising, as an active base, a triglyceride of saturated fatty acids (I) of the following general formula:

wherein: $R^1$, $R^2$ and $R^3$ are the same or different linear aliphatic hydrocarbon groups containing from 5 to 21 carbon atoms.

The benefits and advantages of the present invention are also achieved in accordance with the composition aspects thereof by providing a composition for the freshness-preservation of foodstuffs comprising, as an active base, a triglyceride of saturated fatty acids (I) of the following general formula:

wherein: $R^1$, $R^2$ and $R^3$ are the same or different linear aliphatic hydrocarbon groups containing from 5 to 21 carbon atoms, and as an essential ingredient, a fatty acid (II) containing from 12 to 22 carbon atoms in an amount of from 0.001 to 5.0% by weight on the basis of the total weight of the composition.

DETAILED DESCRIPTION OF THE INVENTION

The triglyceride of saturated fatty acids (I) of this invention is of the following general formula:

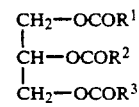

wherein: $R^1$, $R^2$ and $R^3$ are the same or different linear aliphatic hydrocarbon groups containing from 5 to 21 carbon atoms.

The triglyceride of saturated fatty acids which does not come within the scope of the claims of this invention is not preferable because it has problems of low atomization, surface stickiness, cold fluidity, or safety to human body.

Typical examples of the preferred linear aliphatic hydrocarbon group represented by $R^1$, $R^2$ or $R^3$ of the present invention include pentyl, hexyl, heptyl, octyl, nonyl, decyl, undecyl, dodecyl, tridecyl, tetradecyl, pentadecyl, hexadecyl, heptadecyl, octadecyl, nonadecyl, eicocyl, henicocyl, pentenyl, hexenyl, heptenyl, octenyl, nonenyl, decenyl, undecenyl, dodecenyl, tridecenyl, tetradecenyl, pentadecenyl, hexadecenyl, heptadecenyl, octadecenyl, nonadecenyl, eicocenyl, henicocenyl, and the like. Among them, a linear alkyl group containing from 5 to 21 carbon atoms, more preferably 5 to 11 carbon atoms, is preferable because of its oxidative stability.

Although any processes for manufacturing such a triglyceride of saturated fatty acids of the present invention may be acceptable, one typical process comprises:

hydrolyzing a fat to prepare fatty acid and glycerin
    extracting said fatty acid to obtain a desired fatty acid fraction suitable for use in the present compositions, and then
    esterifying the fatty acid fraction with glycerin.

As can be seen from the fact that the triglycerides of saturated fatty acids of the present invention have been approved as food additives by the Health and Welfare Ministry of Japan, said triglycerides are entirely harmless to human being.

Although single use of a triglyceride of saturated fatty acids may be acceptable, a combined use of a triglyceride of saturated fatty acids with a fatty acid having from 12 to 22 carbon atoms, preferably with a saturated fatty acid having from 12 to 20 carbon atoms, may further strengthen the effect of the present compositions.

Any fatty acids such as a naturally-occurring fatty acid or a synthetic fatty acid containing from 12 to 22 carbon atoms may be employed in the present invention, with a linear or branched chain fatty acid being acceptable. Typical examples of the acid of the present invention include lauric acid, tridecylic acid, myristic acid, pentadecylic acid, palmitic acid, heptadecylic acid, stearic acid, nonadecanic acid, arachic acid, behenic acid, oleic acid, elaidic acid, cetoleic acid, erucic acid, brassidic acid, linoleic acid, linolenic acid, arachidonic acid, stearolic acid, mixtures thereof, and the like. Among them, a saturated fatty acid of 14, 16, 18 or 20 carbon atoms, or mixtures thereof is preferred.

These fatty acids have been designated as odorants in the legal definition of the term "food additives", and sorted into one of the standard raw materials used in the production of cosmetics and it is clear that they are perfectly nontoxic and safe to the human body.

Other additives may be added optionally to the present compositions to strengthen further the effect of the compositions. Such optional additives should be entirely nontoxic to the human body. Preferred optional additives used in the present compositions include germicide comprising alcohols such as ethyl alcohol and oleyl alcohol; citric acid; the oil and fats manufactured from animals and plants and partially hydrogenated products thereof; higher fatty acid esters such as methyl laurate and butyl stearate; as well as fungicide and concurrently antioxidant comprising tert-butyl hydroxyanisol, dibutyl hydroxytoluene, tocopherols (vitamin E), and the like.

One or more of the optional additives can be incorporated into a composition of the present invention. Although the amount of said additive may be selected suitably, an amount of less than 3.0% by weight, preferably an amount ranging from 0.001 to 5.0 and more preferably 3.0% by weight on the basis of the total weight of the composition is usually appropriate.

According to the present invention, there is provided a method for preserving the degree of freshness of foodstuffs wherein the method comprises spraying or coating the surface of foodstuffs with a composition of the present invention.

In order to further illustrate the compositions of the present invention, the following, specific examples are provided. It will be understood that the examples as hereinafter set forth are provided for illustrative purposes and are not intended to be limiting of the invention as herein disclosed and set forth in the subjoined claims.

EXAMPLE 1 and 2, COMPARATIVE EXAMPLE 1 through 3

The food preservative compositions of this invention used in Example 1 and 2 were prepared in accordance with Table 1. The effect of the present compositions for the freshness-preservation of foodstuffs was evaluated by the following tests and the results of the tests are also set forth in Table 1 wherein Comparative Example 1 through 3 give the results of the tests for conventional food preservatives and Comparative Example 4 shows the results of the blank test.

THE TEST FOR THE FRESHNESS-PRESERVING POWER AND FOR THE WATER-RETAINING POWER

As to mandarin orange, a weight loss of the spray-coated orange was measured after two weeks of standing at room temperature.

As to salmon roes, the power was rated by visual inspection of the spray-coated roes after two weeks of standing at room temperature.

Ratings:
⊚: great
○: competent
Δ: incompetent
X: poor

THE TEST FOR THE ANTIBACTERIAL ACTIVITY

The activity was rated by visual inspection of the spray-coated foods in Table 1 after one week of standing.

Ratings:
⊚: no change
○: a slight change
Δ: a partial change
X: a complete change These results lead to the conclusion that the present compositions are harmless to human being and have an excellent food-preservative effect in comparison with the one of conventional food preservatives.

TABLE 1

|  | Example 1 | Example 2 | Example 1[1] | Example 2[1] | Example 3[1] | Example 4[1] |
|---|---|---|---|---|---|---|
| Fatty acid ($C_{18}$) | 0.1 | 0.1 | paraffin wax (used for farm products) | aqueous solution (ERITHOBIN -type) | liquid paraffin (used for livestock products) | untreatment |
| Dibutyl hydroxytoluene | — | 0.02 | | | | |
| Tocopherols | — | — | | | | |
| Glycerides* | balance | balance | | | | |
| Freshness preserving and Water retaining power (weight loss %) | | | | | | |
| Mandarin orange | 3 | 2 | 6 | — | — | 20 |
| Roes of salmon | ○ | ⊚ | — | ○ | — | X |
| Antibacterial activity | | | | | | |
| Banana | ○ | ⊚ | Δ | — | — | X |
| Raw sardine | ○ | ○ | — | Δ | — | X |

TABLE 1-continued

| | Example 1 | Example 2 | Example 1[1)] | Example 2[1)] | Example 3[1)] | Example 4[1)] |
|---|---|---|---|---|---|---|
| Pork | ○ | ○ | — | — | Δ | X |

*Triglyceride of saturated fatty acids ($C_8$, $C_{10}$)
[1)]Comparative

What is claimed is:

1. In the method of preserving the freshness of a food product by applying a preservative thereto, the improvement which comprises employing a freshness preserving amount of a composition for the freshness-preservation of foodstuffs comprising, as an active base, a freshness preserving amount of a triglyceride of saturated fatty acids (I) corresponding to the following general formula:

$$\begin{array}{l} CH_2-OCOR^1 \\ CH-OCOR^2 \\ CH_2-OCOR^3 \end{array} \quad (I)$$

wherein: $R^1$, $R^2$ and $R^3$ are the same or different linear aliphatic hydrocarbon groups containing from 5 to 11 carbon atoms, as the applied preservative.

2. The method of claim 1 wherein said composition contains in addition from about 0.01 to about 5.0% by weight, based on the weight of the total composition, of at least one of dibutyl hydroxytoluene and tocopherols.

3. In the method of preserving the freshness of a food product by applying a preservative thereto, the improvement which comprises employing a freshness preserving amount of a composition for the freshness preservation of foodstuffs comprising, as an active base, a freshness preserving amount of a triglyceride of saturated fatty acids (I) corresponding to the following general formula:

$$\begin{array}{l} CH_2-OCOR^1 \\ CH-OCOR^2 \\ CH_2-OCOR^3 \end{array} \quad (I)$$

wherein: $R^1$, $R^2$ and $R^3$ are the same or different linear aliphatic hydrocarbon groups containing from 5 to 11 carbon atoms, and as an essential ingredient, a fatty acid (II) containing from 12 to 20 carbon atoms in an amount of from about 0.001 to about 5.0% by weight on the basis of the total weight of the composition as the applied preservative.

4. The method of claim 3, wherein said composition contains in addition from about 0.01 to about 5.0% by weight based on the weight of the total composition, of at least one of dibutyl hydroxytoluene and tocopherols.

5. The method of claim 3 in which the triglyceride of saturated fatty acids (I) is at least 92% by weight of the composition.

* * * * *